(12) United States Patent
Hu et al.

(10) Patent No.: US 11,938,868 B2
(45) Date of Patent: Mar. 26, 2024

(54) PHOTOGRAPHING DEVICE FOR VEHICLE

(71) Applicant: APOLLO INTELLIGENT CONNECTIVITY (BEIJING) TECHNOLOGY CO., LTD., Beijing (CN)

(72) Inventors: Jingsheng Hu, Beijing (CN); Zongtao Fan, Beijing (CN); Bolei Wang, Beijing (CN); Rui Ren, Beijing (CN); Cheng Tan, Beijing (CN); Jiali Zhang, Beijing (CN); Yanfu Zhang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 588 days.

(21) Appl. No.: 17/131,393

(22) Filed: Dec. 22, 2020

(65) Prior Publication Data
US 2021/0370844 A1    Dec. 2, 2021

(30) Foreign Application Priority Data

May 29, 2020    (CN) .......................... 202010479770.4
May 29, 2020    (CN) .......................... 202020962160.5

(51) Int. Cl.
| | |
|---|---|
| *B60R 11/04* | (2006.01) |
| *B60S 1/02* | (2006.01) |
| *B60S 1/52* | (2006.01) |
| *B60S 1/54* | (2006.01) |
| *B60R 11/00* | (2006.01) |

(52) U.S. Cl.
CPC ............... *B60R 11/04* (2013.01); *B60S 1/023* (2013.01); *B60S 1/522* (2013.01); *B60S 1/544* (2013.01); *B60R 2011/0071* (2013.01); *B60R 2011/0085* (2013.01)

(58) Field of Classification Search
USPC .......................................................... 396/419
See application file for complete search history.

(56) References Cited

U.S. PATENT DOCUMENTS

| | | | |
|---|---|---|---|
| 5,708,859 A | | 1/1998 | Tajima et al. |
| 2019/0162953 A1 | | 5/2019 | Bretagnol et al. |

FOREIGN PATENT DOCUMENTS

| | | | | |
|---|---|---|---|---|
| CN | 103129473 A | * | 6/2013 | |
| CN | 106347316 B | * | 5/2018 | ............... B60R 1/00 |

(Continued)

OTHER PUBLICATIONS

European Patent Application No. 21164316.8, Search and Opinion dated Aug. 4, 2021, 9 pages.

(Continued)

*Primary Examiner* — Clayton E. LaBalle
*Assistant Examiner* — Warren K Fenwick
(74) *Attorney, Agent, or Firm* — COZEN O'CONNOR

(57) ABSTRACT

A photographing device for a vehicle and relates to the field of automatic driving technology is disclosed. The specific solution is that the photographing device includes a seat; a camera mounted on the seat; a lens holder mounted on the seat and rotatable relative to the seat; a transparent lens mounted on the lens holder and arranged opposite to the camera; and a driving assembly connected with the lens holder to drive the lens holder to rotate relative to the base.

19 Claims, 7 Drawing Sheets

(56) References Cited

FOREIGN PATENT DOCUMENTS

| | | | |
|---|---|---|---|
| CN | 115356821 A | * | 11/2022 |
| DE | 102008027430 A1 | | 2/2009 |
| JP | S6260022 A | | 3/1987 |
| JP | H09106973 A | | 4/1997 |
| JP | 2001249376 A | | 9/2001 |
| JP | 2008165093 A | | 7/2008 |
| JP | 2011155468 A | | 8/2011 |
| JP | 2015113118 A | | 6/2015 |
| JP | 2015182656 A | | 10/2015 |
| JP | 2017165287 A | | 9/2017 |
| JP | 2019207313 A | | 12/2019 |
| JP | 2019537538 A | | 12/2019 |
| JP | 2020016862 A | | 1/2020 |
| KR | 20060023908 A | | 3/2006 |
| KR | 20100111862 A | | 10/2010 |
| WO | WO 2017110628 A | | 6/2017 |

OTHER PUBLICATIONS

Korean Patent Application No. 10-2021-0037428, Office Action dated Apr. 22, 2022, 5 pages.
Korean Patent Application No. 10-2021-0037428, English translation of Office Action dated Apr. 22, 2022, 5 pages.
Japanese Patent Application No. 2021-088854, Office Action dated Oct. 4, 2022, 3 pages.
Japanese Patent Application No. 2021-088854, English translation of Office Action dated Oct. 4, 2022, 3 pages.

* cited by examiner

PHOTOGRAPHING DEVICE FOR VEHICLE

CROSS-REFERENCE TO RELATED APPLICATIONS

This application is based upon and claims priority to Chinese Patent Application No. 202010479770.4, and Chinese Patent Application No. 202020962160.5, both of which were filed on May 29, 2020, the entire contents of which are incorporated herein by reference.

TECHNICAL FIELD

This application relates to the field of automatic driving technology, and more particularly to a photographing device for a vehicle.

BACKGROUND

In the related art, when a vehicle is driving on a rainy day, a lens of a camera disposed outside the vehicle will be subject to raindrops, and thus the imaging of acquired information will be affected. As a result, the image information acquired by the camera lens may be different from the actual information on road and vehicle conditions, and the recognition of traffic signals and obstacles may be inaccurate, causing an automatic driving system of the vehicle to make wrong judgments, which will threaten the safety of passengers and vehicles. Moreover, stains on a surface of the lens will also affect imaging and threaten driving safety.

SUMMARY

The present disclosure provides a photographing device for a vehicle. The photographing device can remove raindrops on a lens surface at any time, which results in high imaging definition of a camera and low driving safety hazards.

The photographing device according to embodiments of the present disclosure includes: a seat; a camera mounted on the seat; a lens holder mounted on the seat and rotatable relative to the seat; a transparent lens mounted on the lens holder and arranged opposite to the camera; and a driving assembly connected with the lens holder to drive the lens holder to rotate relative to the base.

For the photographing device according to the embodiments of the present disclosure, by providing the lens holder which is rotatable relative to the base and on which the transparent lens is mounted, and by providing the driving assembly for driving the lens holder to rotate relative to the base, the lens holder can be driven to rotate using the driving assembly, and the transparent lens can be brought into rotation. During the rotation, a centrifugal force of the transparent lens can hurl out raindrops on the transparent lens, thereby making a surface of the transparent lens maintain a better light transmission effect and improving the reliability of the camera's clear imaging. Moreover, the raindrops on the surface of the transparent lens can be removed at any time during driving to reduce safety hazards during driving.

It should be understood that the description in this section is not intended to indicate crucial or important features of the embodiments of the present disclosure or limit the scope of the present disclosure. Other features of the present disclosure will be readily appreciated from the following description.

BRIEF DESCRIPTION OF THE DRAWINGS

The accompanying drawings are used for better understanding of the present disclosure rather than limitation of the present disclosure.

DETAILED DESCRIPTION

Figure 1:
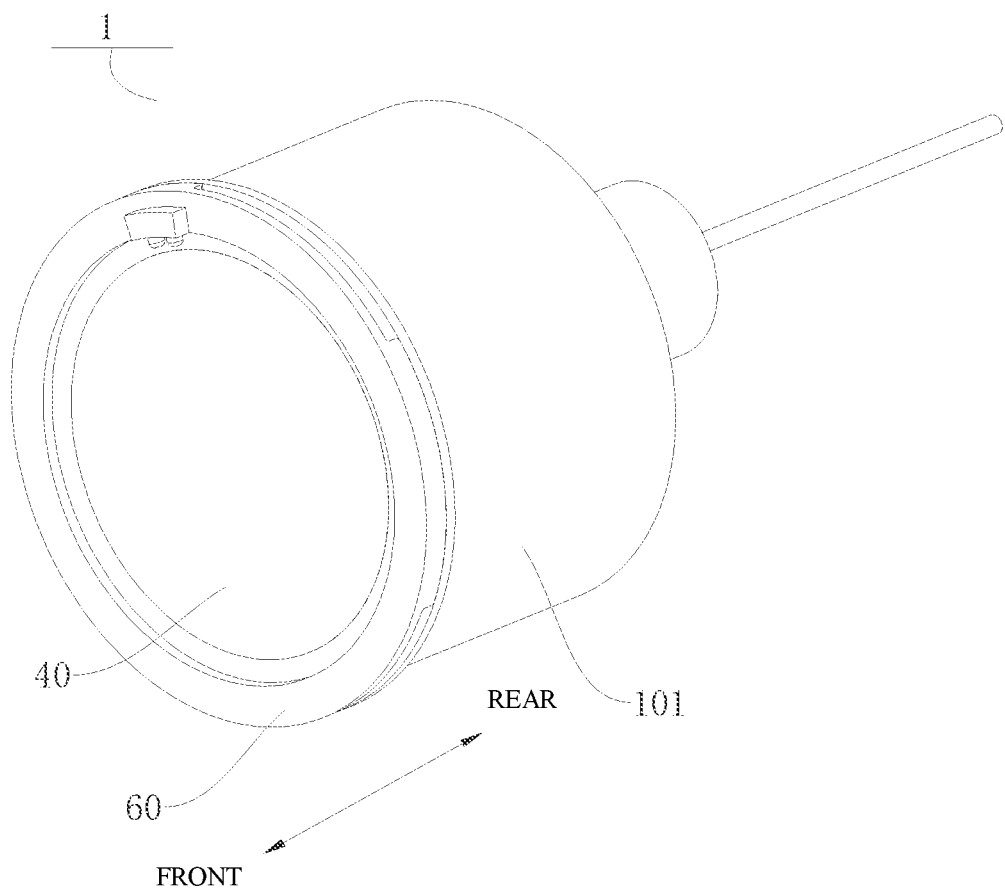
FIG. 1 is a perspective view of a photographing device for a vehicle according to a first embodiment of the present disclosure.

Exemplary embodiments of the present disclosure will be illustrated below with reference to the accompanying drawings, which include various details of the embodiments of the present disclosure to facilitate understanding, and which should be considered to be merely exemplary. Therefore, a person skilled in the art should recognize that various changes and modifications can be made to the embodiments described herein without departing from the scope of the present disclosure. For clarity and conciseness, description about well-known functions and structures will be omitted.

A photographing device for a vehicle according to embodiments of the present disclosure will be described below with reference to FIGS. 1-13.

As shown in FIGS. 1-13, the photographing device 1 according to the embodiments of the present disclosure includes a base 10, a camera 20, a lens holder 30, a transparent lens 40, and a driving assembly 50.

Figure 2:
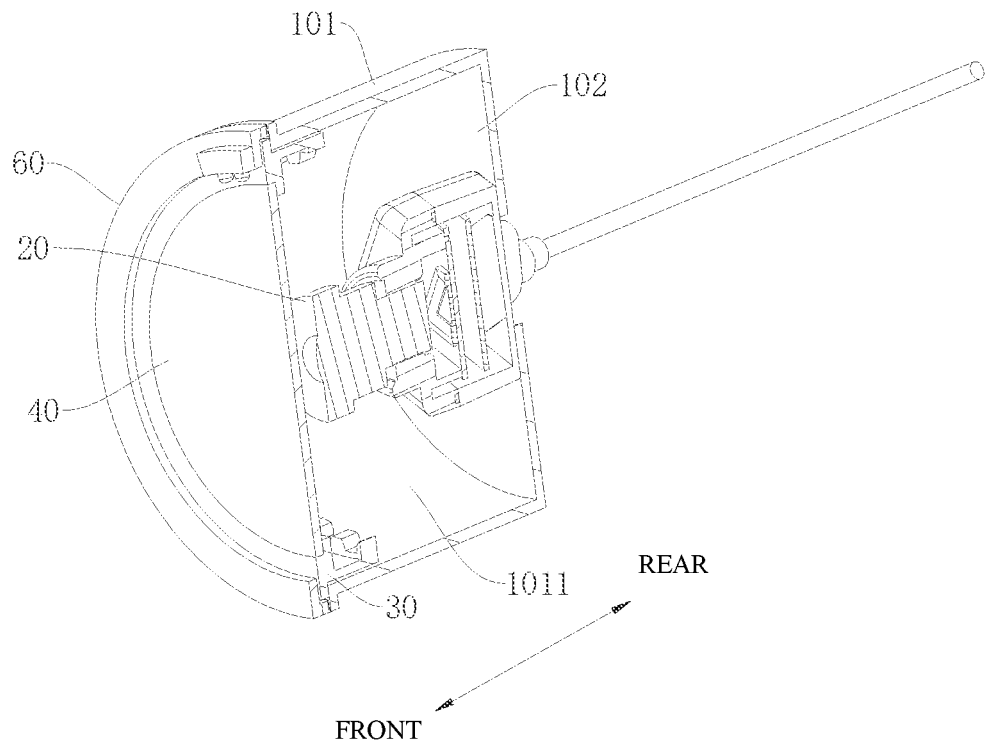
FIG. 2 is a cutaway view of the photographing device in FIG. 1.
Figure 3:
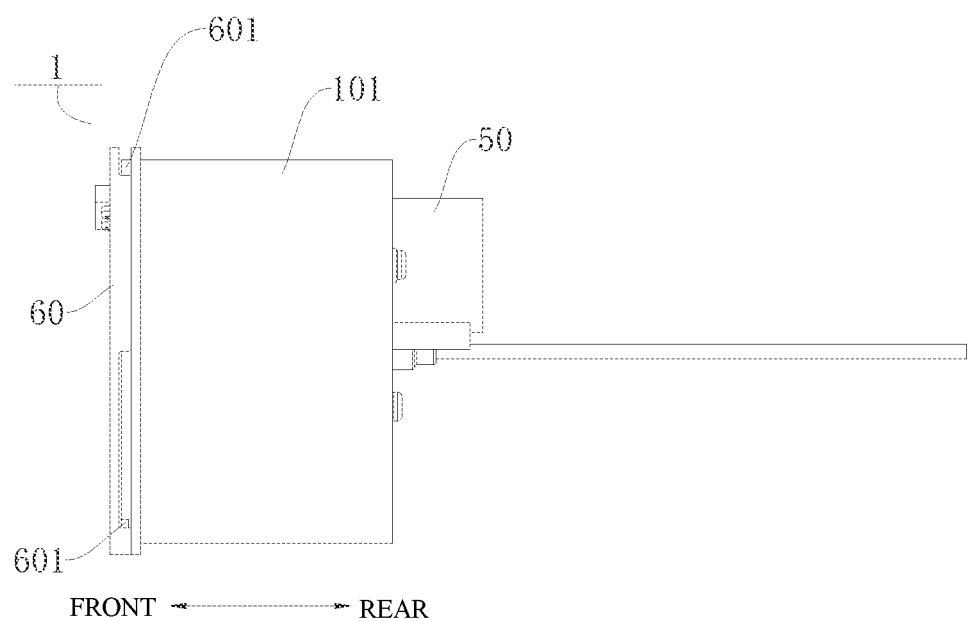
FIG. 3 is a side view of the photographing device in FIG. 1.
Figure 4:
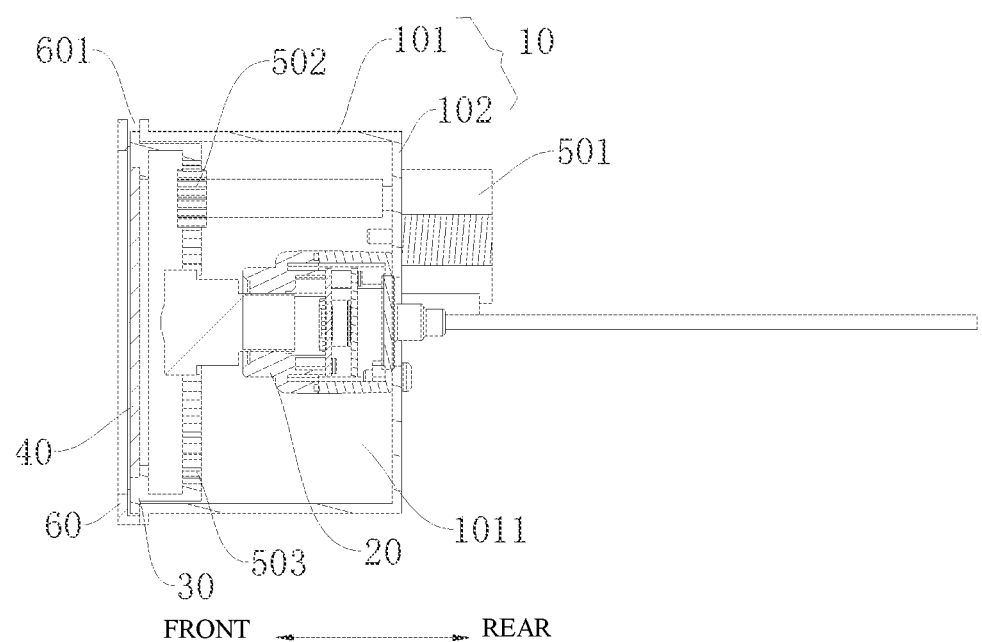
FIG. 4 is a sectional view of the photographing device in FIG. 1.
Figure 5:
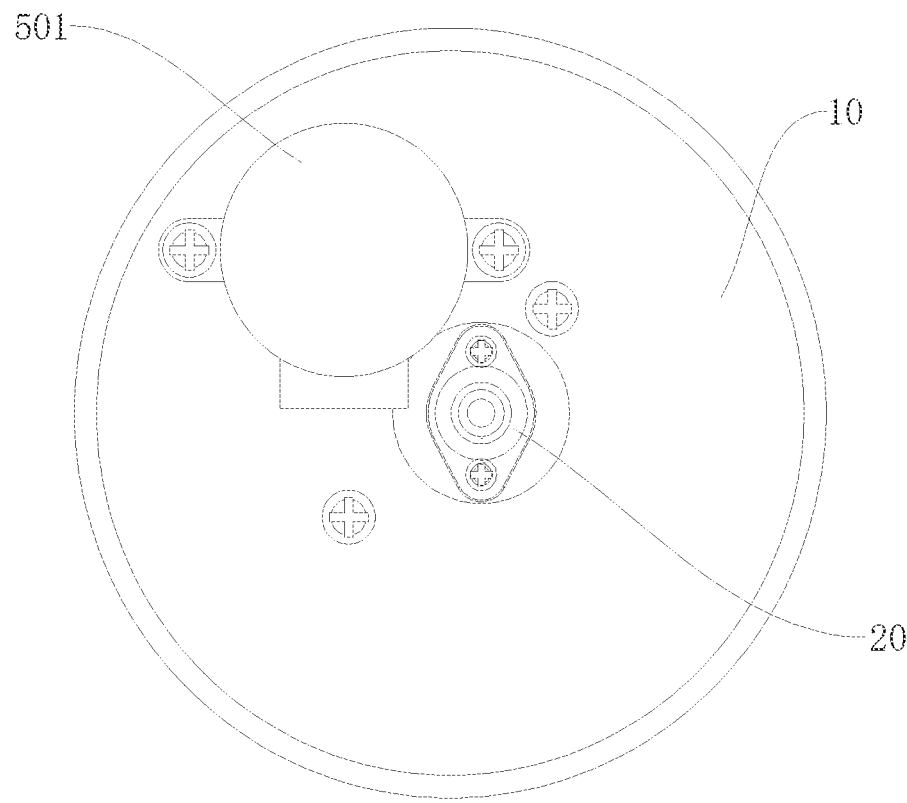
FIG. 5 is a rear view of the photographing device in FIG. 1.

As shown in FIGS. 2 and 4, the camera 20 is mounted on the base 10; the lens holder 30 is mounted on the base 10 and is rotatable relative to the base 10; the transparent lens 40 is mounted on the lens holder 30 and arranged opposite to the camera 20; the driving assembly 50 is connected with the lens holder 30 to drive the lens holder 30 to rotate relative to the base 10. Specifically, as shown in FIGS. 2 and 4, a rear end of the camera 20 is connected to the base 10, and the lens holder 30 is arranged on a front side of a lens of the camera 20, so that the camera 20 can perform clear imaging through the transparent lens 40 mounted on the lens holder 30.

Therefore, according to the technical solution of the embodiments of the present disclosure, by providing the lens holder which is rotatable relative to the base and on which the transparent lens is mounted, and by providing the driving assembly for driving the lens holder to rotate relative to the base, the lens holder can be driven to rotate using the driving assembly, and the transparent lens can be brought into rotation. During the rotation, a centrifugal force of the transparent lens can hurl out raindrops on the transparent lens, thereby making a surface of the transparent lens maintain a better light transmission effect and improving the reliability of the camera's clear imaging. Moreover, the raindrops on the surface of the transparent lens can be removed at any time during driving to reduce safety hazards during driving.

In some embodiments, as shown in FIGS. 1-7, the base 10 includes a cylindrical member 101 and a cover plate 102. The cylindrical member 101 has a chamber 1011, and a first end (a front end as shown in FIG. 2) of the cylindrical member 101 is opened to make a first end of the chamber 1011 open. The cover plate 102 is arranged at a second end (a rear end as shown in FIG. 2) of the cylindrical member 101 to cover a second end of the chamber 1011. The camera 20 is mounted on the cover plate 102 and located in the chamber 1011. The lens holder 30 is mounted at the first end of the cylindrical member 101 to cover, together with the transparent lens 40, the first end of the chamber 1011.

Specifically, as shown in FIGS. 1-7, the cylindrical member 101 extends in a front-rear direction, a rear end of the chamber 1011 of the cylindrical member 101 is open, and the rear end of the cylindrical member 101 is provided with the cover plate 102 to cover the rear end of the chamber 1011. Preferably, the cylindrical member 101 and the cover plate 102 are integrally formed, that is, the base 10 is an integrally formed member. It should be noted that the cylindrical member 101 and the cover plate 102 may also be two separate structural members. After the cylindrical member 101 and the cover plate 102 are formed separately, the cover plate 102 is connected to the rear end of the cylindrical member 101 to form the base 10.

A front end of the chamber 1011 of the cylindrical member 101 is open, and the lens holder 30 is mounted at the front end (the first end) of the cylindrical member 101 and provided with a through hole that runs through the lens holder 30 in the front-rear direction. The transparent lens 40 is mounted in the through hole and opposite to the camera 20 in the front-rear direction. The lens holder 30 and the transparent lens 40 together shield the front end of the chamber 1011. Therefore, a relatively sealed space (chamber) can be formed by the cover plate, the cylindrical member, the lens holder, and the transparent lens, and external water vapor or dust can be prevented from invading the chamber, which is beneficial for clear imaging of the camera in the chamber and enhances the damage resistance.

In some embodiments, as shown in FIGS. 1-9, the photographing device 1 further includes a retaining ring 60. The retaining ring 60 is arranged at the first end of the cylindrical member 101, and a part of the lens holder 30 is clamped between the retaining ring 60 and the first end of the cylindrical member 101. Therefore, the clamping by the retaining ring and the cylindrical member can be used to prevent the lens holder from moving in the front-rear direction, and the assembling reliability of the transparent lens can be improved. In the embodiment shown in FIG. 1, the retaining ring 60 is a circular ring. It can be understood that the shape of the retaining ring 60 is not limited to that shown in FIG. 1, and instead, the retaining ring 60 can be provided suitably according to the opening shape of the cylindrical member 101.

Figure 8:
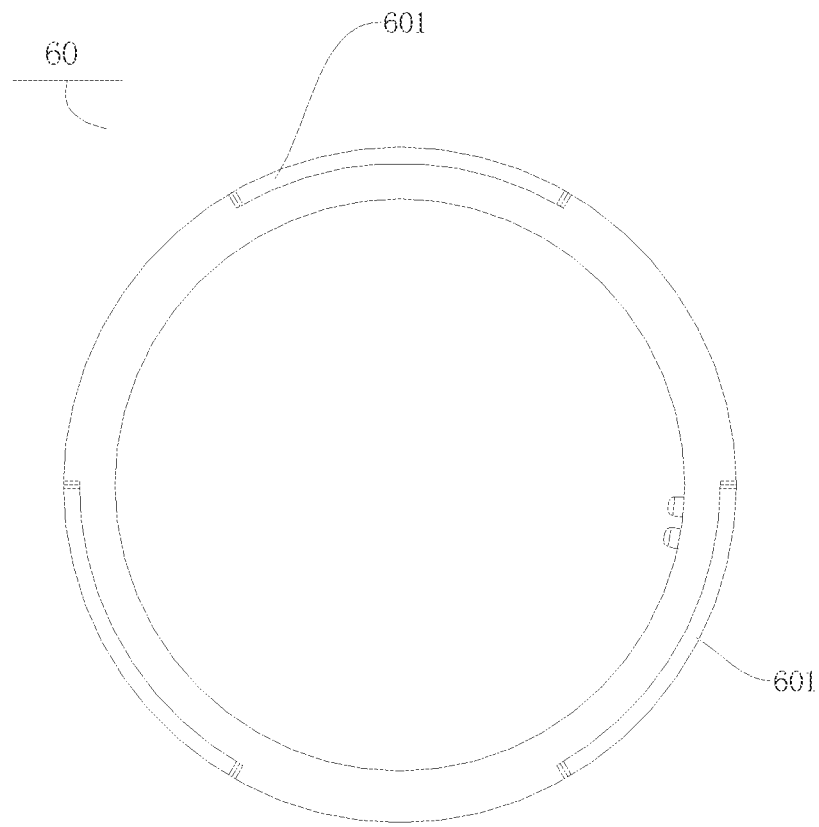
FIG. 8 is a front view of a retaining ring of a photographing device for a vehicle according to an embodiment of the present disclosure.
Figure 9:
FIG. 9 is a side view of the retaining ring in FIG. 8.

In some embodiments, as shown in FIGS. 8 and 9, the retaining ring 60 is provided with a water guiding groove 601 that has a length extending along a peripheral direction of the retaining ring 60, a width extending along a radial direction of the retaining ring 60, and a depth extending along an axial direction of the retaining ring 60. In other words, the water guiding groove 601 is a groove extending along the peripheral direction of the retaining ring 60 and having a certain depth in the axial direction of the retaining ring 60, so that the water guiding groove can be used to drain the raindrops hurled out by the transparent lens to the outside of the photographing device.

Specifically, as shown in FIGS. 4, 7, 8 and 9, the water guiding groove 601 extends along the peripheral direction of the retaining ring 60 to form the length of the water guiding groove 601. The water guiding groove 601 extends forward from a rear end surface of the retaining ring 60 to form the depth of the water guiding groove 601 and extends inward from an outer peripheral surface of the retaining ring 60 to form the width of the water guiding groove 601.

Further, as shown in FIGS. 1-9, there are a plurality of water guiding grooves 601, and the plurality of water guiding grooves 601 are arranged at intervals along the peripheral direction of the retaining ring 60. Thus, the efficiency and reliability of guiding water by the water guiding groove can be improved.

In some embodiments, as shown in FIG. 4, the driving assembly 50 includes a motor 501, a gear 502, and a gear ring 503. The motor 501 is mounted on the cover plate 102 and located outside the chamber 1011. The gear 502 is located in the chamber 1011 and connected to an output shaft of the motor 501. The gear ring 503 is mounted on the lens holder 30 and arranged in the chamber 1011, and the gear ring 503 meshes with the gear 502. Specifically, a front end of the motor 501 is mounted to a rear end surface of the cover plate 102. The output shaft of the motor 501 extends forward into the chamber 1011, and the gear 502 is connected to a front end of the output shaft. The gear ring 503 extends along a peripheral direction of the lens holder 30 and arranged on a rear side of the lens holder 30.

The output shaft of the motor can drive the gear to rotate, and the engagement between the gear and the gear ring can drive the gear ring 503 to rotate. In turn, the rotation of the gear ring can drive the lens holder to rotate, so that the transparent lens rotates along with the lens holder to hurl out the raindrops on the surface of the transparent lens.

In addition, in the embodiment shown in FIG. 4, the base 10, the lens holder 30, the retaining ring 60, and the gear 502 can be made of engineering plastics with self-lubricity, abrasion resistance, and good mechanical properties, so as to reduce the abrasion of components and parts of the photography device during the rotation of the lens holder. The transparent lens 40 may be spherical, which can facilitate the hurl-out of raindrops.

Figure 6:
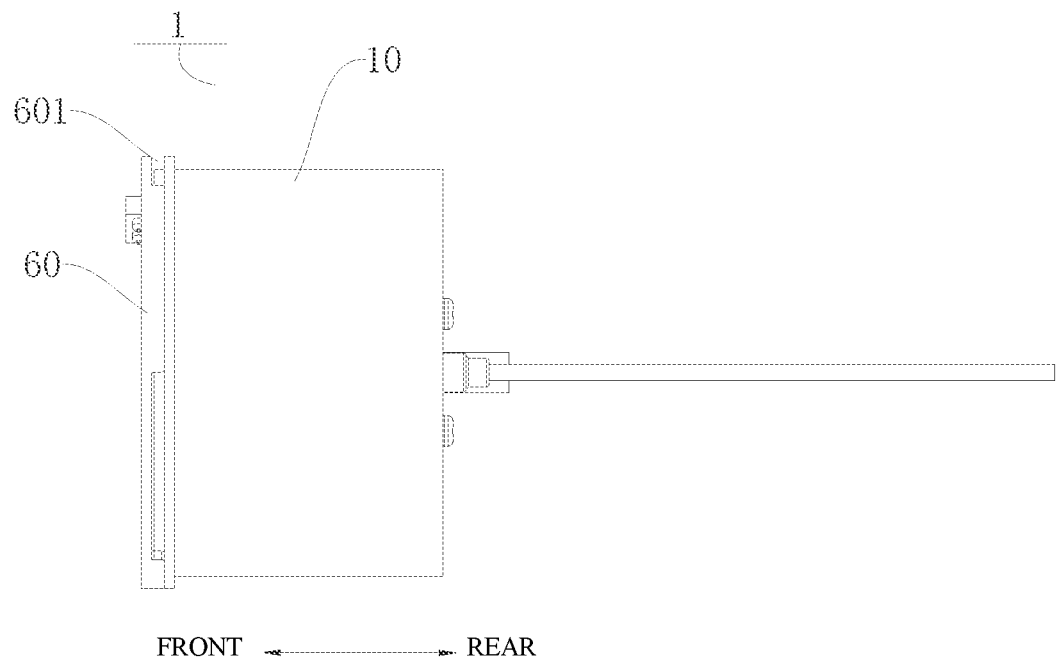
FIG. 6 is a side view of a photographing device for a vehicle according to a second embodiment of the present disclosure.
Figure 7:
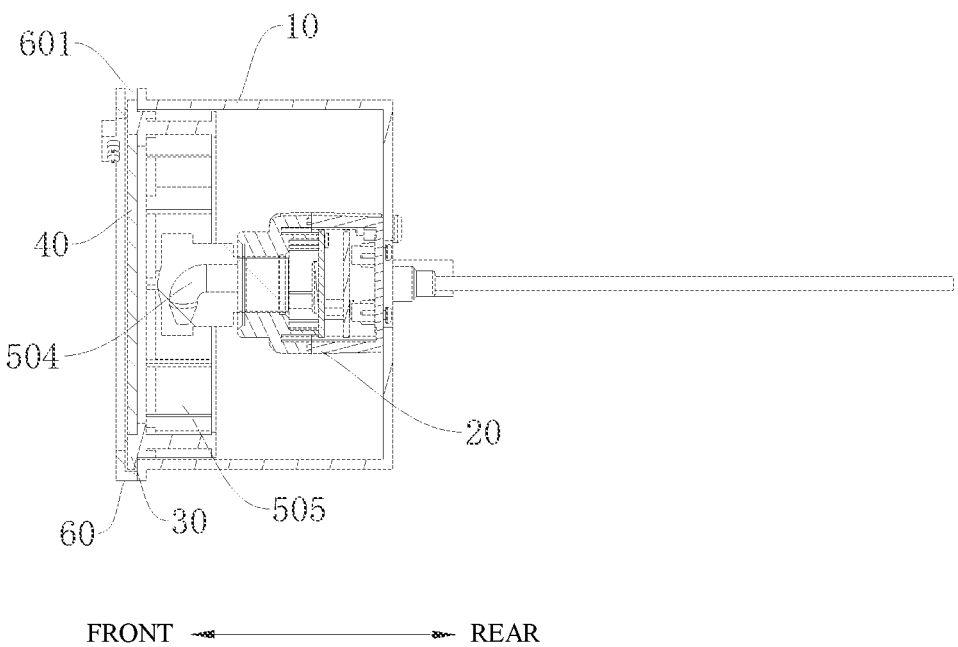
FIG. 7 is a sectional view of the photographing device in FIG. 6.

It can be understood that the driving assembly 50 is not limited to the embodiments shown in FIGS. 1-4. For example, in other embodiments, as shown in FIGS. 6 and 7, the driving assembly 50 includes a first compressed gas nozzle 504 and a plurality of blades 505 mounted on the lens holder 30. The first compressed gas nozzle 504 and the blades 505 are arranged in the chamber 1011. The first compressed gas nozzle 504 can eject compressed gas to the blades 505 to drive the blades 505 to rotate. As a result, the compressed gas ejected by the first compressed gas nozzle can be used as power to drive the blades to rotate, and in turn the blades are used to drive the lens holder to rotate, so that the transparent lens can rotate and hurl out raindrops. In addition, the compressed gas ejected by the first compressed gas nozzle can also remove mist in the chamber and improve the imaging clarity of the camera.

In an embodiment shown in FIG. 7, the base 10, the lens holder 30, and the retaining ring 60 can be made of engineering plastics with self-lubrication, abrasion resistance, and good mechanical properties, to reduce the wear and tear of parts of the photographing device when the lens holder rotates.

Figure 10:
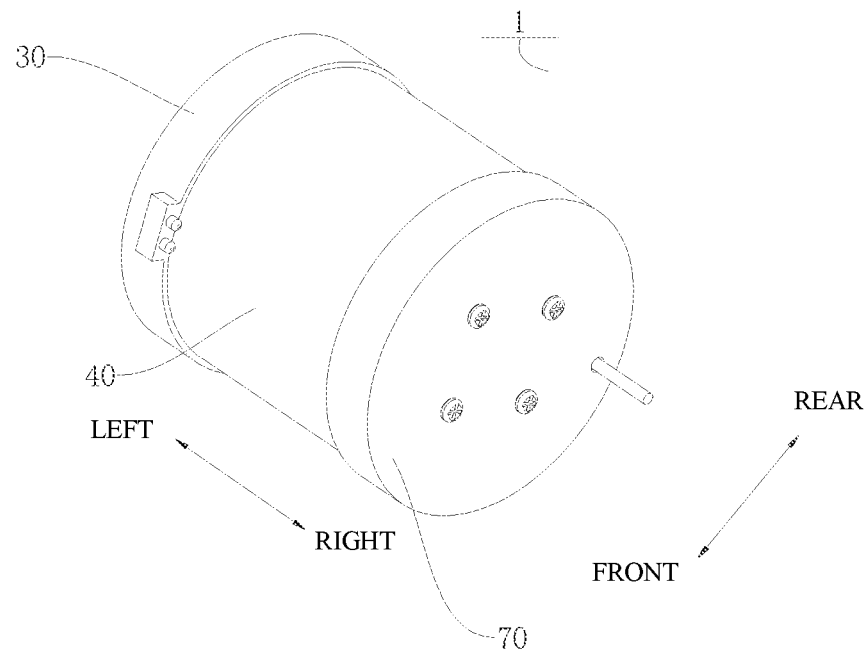
FIG. 10 is a perspective view of a photographing device for a vehicle according to a third embodiment of the present disclosure.

The structures of the base 10 and the transparent lens 40 are not limited to the embodiments shown in FIGS. 1-7. For example, in other embodiments, as shown in FIGS. 10-13, the transparent lens 40 is substantially cylindrical, the lens holder 30 is provided with a first annular groove 301, a first end of the transparent lens 40 is fitted in the first annular groove 301, and the base 10 is arranged in the transparent lens 40. Specifically, as shown in FIG. 10, the transparent lens 40 is a cylindrical structural member extending in a left-right direction (i.e., the left-right direction as shown in FIG. 10), and the camera 20 is mounted on the base 10. The substantially cylindrical transparent lens has a large light transmission range and high light transmission intensity, which is conducive to the clear imaging of the camera. The lens holder 30 is mounted at a right end of the transparent lens 40, the first annular groove 301 extends along the peripheral direction of the lens holder 30 and is opened leftwards, and the right end of the transparent lens 40 can be inserted into the first annular groove 301, thereby improving the convenience of assembling the lens holder and the transparent lens.

Figure 11:
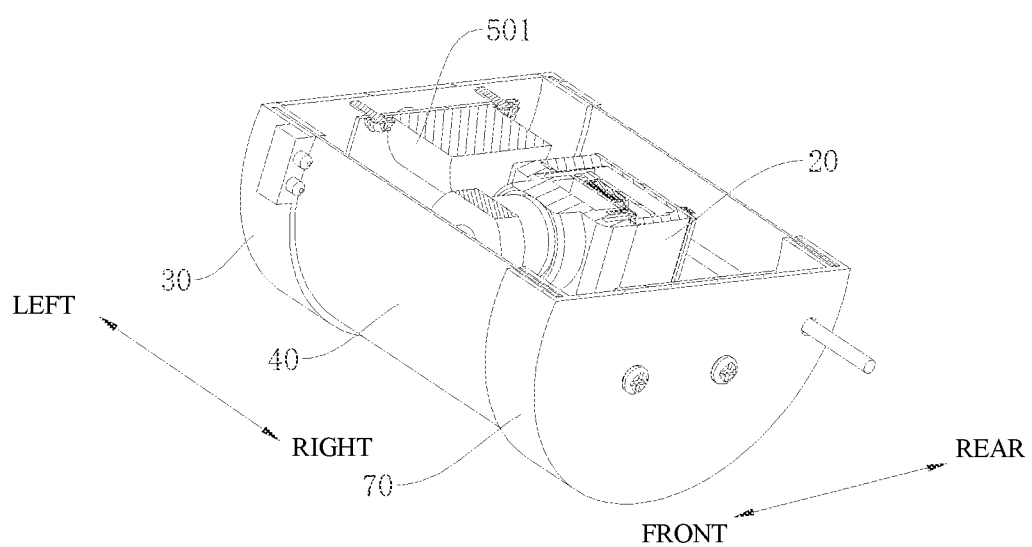
FIG. 11 is a cutaway view of the photographing device in FIG. 10.
Figure 12:
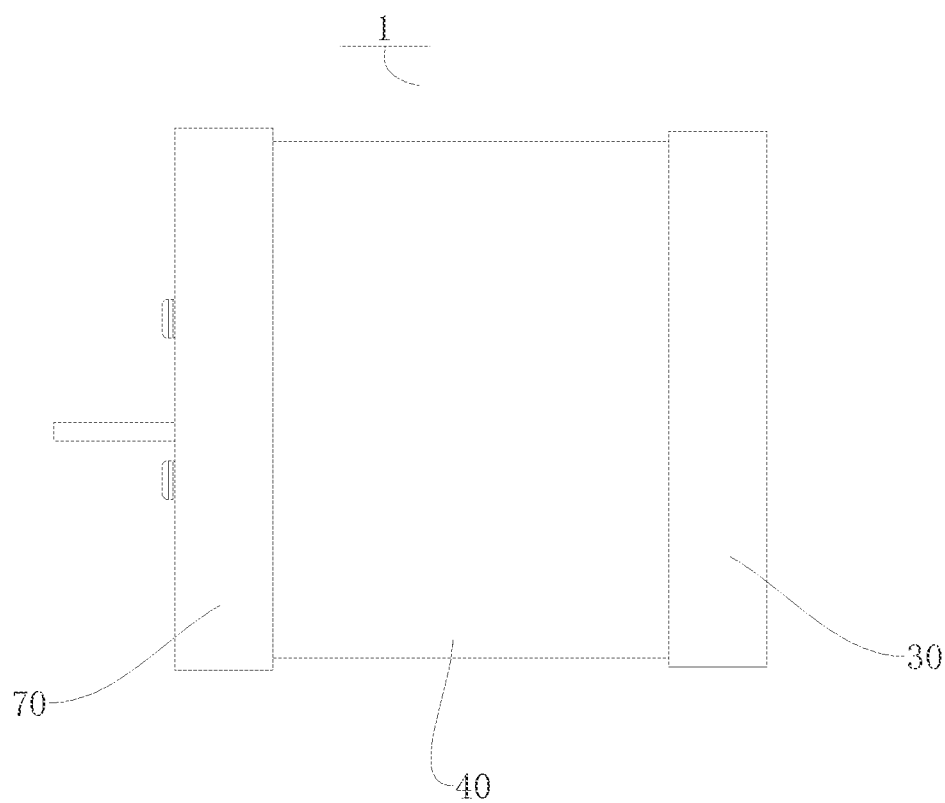
FIG. 12 is a front view of the photographing device in FIG. 10.
Figure 13:
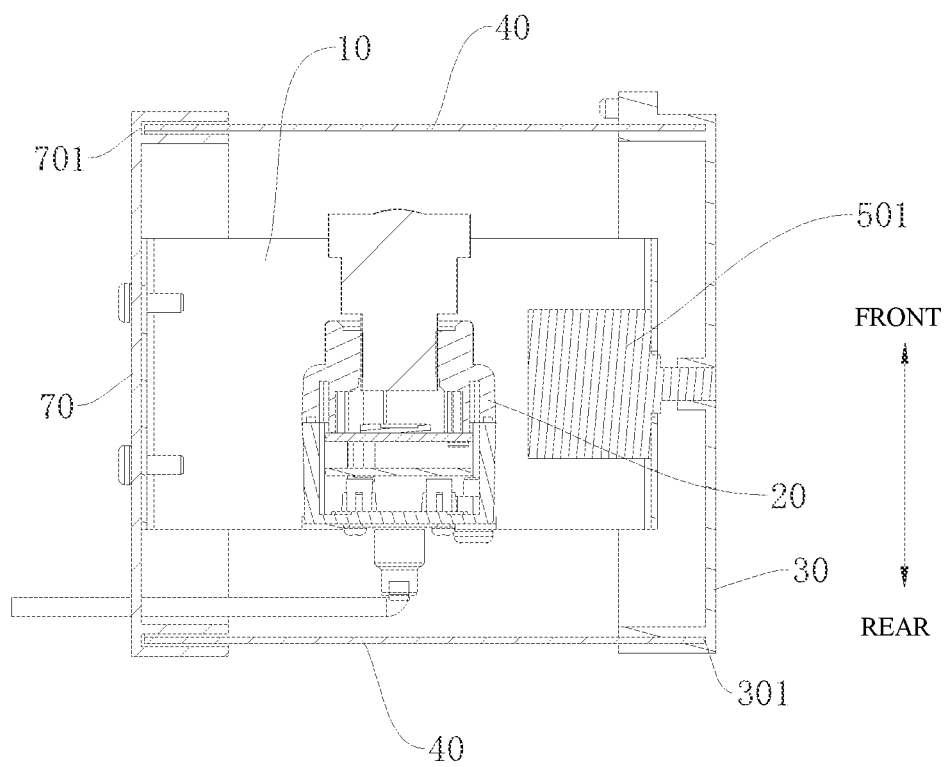
FIG. 13 is a sectional view of the photographing device in FIG. 10.

In some specific embodiments, as shown in FIG. 10, FIG. 11 and FIG. 13, the photographing device 1 further includes a guide seat 70 connected to the base 10 and arranged opposite to the lens holder 30. The guide seat 70 is provided with a second annular groove 701, and a second end of the transparent lens 40 is fitted in the second annular groove 701. Specifically, the guide seat 70 is disposed at a left end (i.e., the second end) of the transparent lens 40, the guide seat 70 is mounted on the base 10, the second annular groove 701 extends in a peripheral direction of the guide seat 70 and is opened rightwards, and the left end of the transparent lens 40 is suitable to be inserted into the second annular groove 701.

Therefore, the way of assembling the guide seat and the transparent lens can be simplified, the rotation of the transparent lens can be guided by the second annular groove, and the guide seat, the transparent lens, and the lens holder can constitute a closed receiving space to protect the camera in the transparent lens from being corroded by moisture and dust.

In some specific embodiments, as shown in FIG. 10 and FIG. 11, the lens holder 30 and the guide seat 70 are both substantially cylindrical, which facilitates the adaptation to the substantially cylindrical transparent lens 40. The driving assembly 50 includes the motor 501, the output shaft of the motor 501 is connected to the lens holder 30, and the motor 501 is suitable to drive the lens holder 30 to rotate. In turn, the lens holder 30 can drive the transparent lens 40 to rotate to hurl out raindrops on the surface of the transparent lens 40.

In the embodiment shown in FIGS. 10-13, the base 10, the lens holder 30, and the lens guide seat 70 can be made of engineering plastics with self-lubrication, abrasion resistance, and good mechanical properties, to reduce the wear and tear of parts of the photographing device when the lens holder rotates.

In some embodiments, the photographing device 1 further includes a second compressed gas nozzle (not shown) that can eject compressed gas toward the transparent lens 40 from the outside of the transparent lens 40. Therefore, the compressed gas ejected from the second compressed gas nozzle can be used to blow away stains on an outer surface of the transparent lens, which is further conducive to the clear imaging of the camera.

In some embodiments, the photographing device 1 further includes a third compressed gas nozzle (not shown) that can eject compressed gas toward the transparent lens from the inside of the transparent lens. Therefore, the compressed gas ejected from the third compressed gas nozzle can be used to remove the mist within the photographing device, and further improve the imaging clarity. In the embodiment shown in FIGS. 6 and 7, the third compressed gas nozzle may not be provided, and a defogging effect can be achieved when the first compressed gas nozzle 504 drives the blades 505 to rotate.

In some specific embodiments, the photographing device 1 further includes a heating component (not shown) that can be used to heat the compressed gas in the third compressed gas nozzle to defrost and avoid condensation on the surface of the transparent lens.

In some embodiments, the photographing device 1 further includes a cleaning liquid nozzle (not shown) that can spray a cleaning liquid to the transparent lens 40 from the outside of the transparent lens 40. Therefore, the cleaning liquid can be used to remove stains on the outer surface of the transparent lens and make the camera imaging clearer.

In some embodiments, the photographing device 1 further includes a wiper assembly (not shown) that can cooperate with the cleaning liquid nozzle to remove stains on the surface of the transparent lens 40. It can be understood that the wiper assembly can make the cleaning liquid evenly spread on the surface of the transparent lens and can wipe back and forth on the surface of the transparent lens to improve a cleaning effect of the cleaning liquid.

A photographing device for a vehicle according to a specific example of the present disclosure will be described below with reference to FIGS. 1-5 and 8-9.

As shown in FIGS. 1, 2 and 4, the photographing device 1 includes a base 10, a camera 20, a lens holder 30, a transparent lens 40, and a driving assembly 50. As shown in FIG. 2, the base 10 includes a cylindrical member 101 extending in a front-rear direction (e.g., the front-rear direction shown in FIG. 2) and having a chamber 1011. A rear end of the chamber 1011 of the cylindrical member 101 is open, and a cover plate 102 is provided at a rear end of the cylindrical member 101 to cover the rear end of the chamber 1011.

A front end of the chamber 1011 of the cylindrical member 101 is open, and the lens holder 30 is mounted at a front end of the cylindrical member 101. The lens holder 30 is provided with a through hole that runs through the lens holder 30 in the front-rear direction. The transparent lens 40 is mounted in the through hole and opposite to the camera 20 in the front-rear direction. The lens holder 30 and the transparent lens 40 together shield the front end of the chamber 1011.

As shown in FIG. 2, the photographing device 1 includes an annular retaining ring 60 mounted at the front end of the cylindrical member 101 and located on a front side of the lens holder 30, and an edge of the lens holder 30 is sandwiched between the annular retaining ring 60 and the front end of the cylindrical member 101. As shown in FIGS. 8 and 9, the annular retaining ring 60 is provided with a water guiding groove 601 that extends along a peripheral direction of the retaining ring 60 and has a certain width in a radial direction of the retaining ring 60 and a certain depth in a front-rear direction of the retaining ring 60. There are a plurality of water guiding grooves 601 evenly spaced along the peripheral direction of the retaining ring 60.

As shown in FIG. 4, the driving assembly 50 includes a motor 501, a gear 502, and a gear ring 503. A front end of the motor 501 is mounted to a rear end surface of the cover plate 102. An output shaft of the motor 501 extends forward into the chamber 1011. The gear 502 and the gear ring 503 are both located in the chamber 1011. The gear 502 is connected to a front end of the output shaft. The gear ring 503 extends in a peripheral direction of the lens holder 30 and is arranged on a rear side of the lens holder 30. The gear 502 meshes with the gear ring 503.

A photographing device for a vehicle according to another embodiment of the present disclosure will be described below with reference to FIGS. 6-9.

As shown in FIGS. 6 and 7, the photographing device 1 includes a base 10, a camera 20, a lens holder 30, a transparent lens 40, blades 505, and a first compressed gas nozzle 504.

As shown in FIG. 7, the blades 505 are located in the chamber 1011, and the blades 505 are distributed along a peripheral direction of the lens holder 30 and arranged on a rear side of the lens holder 30. The first compressed gas nozzle 504 passes through and is connected to the cover plate 102. A front end of the first compressed gas nozzle 504 is located in the chamber 1011, and a rear end of the first compressed gas nozzle 504 extends out of the chamber 1011, that is, the rear end of the first compressed gas nozzle 504 is located outside the base 10, to facilitate the docking with external ventilation equipment. The front end of the first compressed gas nozzle 504 has a jet orifice that is opened toward the blades 505.

Other structures and operations of the photographing device shown in FIGS. 6 and 7 may be the same as those in the embodiments shown in FIGS. 1-5 and will not be described in detail here.

A photographing device 1 for a vehicle according to another embodiment of the present disclosure will be described below with reference to FIGS. 10-13.

As shown in FIGS. 10-13, the photographing device 1 includes a base 10, a camera 20, a lens holder 30, a transparent lens 40, and a lens guide seat 70. As shown in FIGS. 10 and 11, the transparent lens 40 is a cylindrical structural member extending in a left-right direction (e.g. the left-right direction as shown in FIG. 10), a right end of the transparent lens 40 is also open, and the guide seat 70 is mounted at the right end of the transparent lens 40 to block the open right end. A left end of the transparent lens 40 is open, and the lens holder 30 is mounted at the left end of the transparent lens 40 to block the open left end. The base 10 is arranged in the transparent lens 40, and a right end of the base 10 is connected with the guide base 70. The camera 20 is mounted on the base 10.

As shown in FIG. 11, the photographing device 1 includes a motor 501 located in the transparent lens 40 and mounted on the base 10, and an output shaft of the motor 501 is connected to the lens holder 30.

As shown in FIGS. 11 and 13, the lens holder 30 is provided with a first annular groove 301 that extends along a peripheral direction of the lens holder 30. The first annular groove 301 is opened rightwards, and the left end of the transparent lens 40 is inserted into the first annular groove 301.

As shown in FIGS. 11 and 13, the guide seat 70 is provided with a second annular groove 701 that extends in a peripheral direction of the guide seat 70. The second annular groove 701 is opened leftwards, and the right end of the transparent lens 40 is suitable to be inserted into the second annular groove 701.

In the description of the present disclosure, it should be understood that terms such as "front," "rear," "inner," "outer," "axial," "radial," "circumferential" and the like should be constructed to refer to the orientation or position as then described or as shown in the drawings under discussion. These terms are for convenience and simplification of description and do not indicate or imply that the device or element referred to must have a particular orientation, or be constructed and operated in a particular orientation, so these terms shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means at least two, such as two or three, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present specification, reference throughout this specification to "an embodiment," "some embodiments," "an example," "a specific example," "some examples" or the like means that a particular feature, structure, material, or characteristic described in connection with the embodiment or example is included in at least one embodiment or example of the present disclosure. In the specification, the appearances of the above-mentioned terms are not necessarily referring to the same embodiment or example. Furthermore, the particular features, structures, materials, or characteristics described can be combined in any suitable manner in one or more embodiments or examples.

The above specific embodiments do not limit the protection scope of this application. It should be appreciated by those skilled in the art that various modifications, combinations, sub-combinations, and substitutions can be made according to design requirements and other factors. Any modifications, equivalent substitutions and improvements made within the principles of this application shall be included within the protection scope of this application.

What is claimed is:

1. A photographing device for a vehicle, comprising:
a seat;
a camera mounted on the seat;
a lens holder mounted on the seat and rotatable relative to the seat;
a transparent lens mounted on the lens holder and arranged opposite to the camera; and
a driving assembly connected with the lens holder to drive the lens holder to rotate relative to the base,
wherein the base comprises a cylindrical member and a cover plate; the cylindrical member has a chamber, a first end of the cylindrical member is opened to make a first end of the chamber open, and the cover plate is arranged at a second end of the cylindrical member to cover a second end of the chamber; the camera is mounted on the cover plate and located in the chamber; the lens holder is mounted at the first end of the cylindrical member to cover, together with the transparent lens, the first end of the chamber.

2. The photographing device according to claim 1, further comprising a retaining ring arranged at the first end of the cylindrical member, a part of the lens holder being clamped between the retaining ring and the first end of the cylindrical member.

3. The photographing device according to claim 2, wherein the retaining ring is provided with a water guiding groove that has a length extending along a peripheral direction of the retaining ring, a width extending along a radial direction of the retaining ring, and a depth extending along an axial direction of the retaining ring.

4. The photographing device according to claim 3, wherein a plurality of water guiding grooves are arranged at intervals along the peripheral direction of the retaining ring.

5. The photographing device according to claim 1, wherein the driving assembly comprises a motor, a gear, and a gear ring; the motor is mounted on the cover plate and located outside the chamber; the gear is located in the chamber and connected to an output shaft of the motor; the gear ring is mounted on the lens holder and arranged in the chamber; and the gear ring meshes with the gear.

6. The photographing device according to claim 1, wherein the driving assembly comprises a first compressed gas nozzle and a plurality of blades mounted on the lens holder; the first compressed gas nozzle and the blades are arranged in the chamber; the first compressed gas nozzle ejects compressed gas to the blades to drive the blades to rotate.

7. The photographing device according to claim 6, further comprising a second compressed gas nozzle that ejects compressed gas toward the transparent lens from an outer side of the transparent lens.

8. The photographing device according to claim 1, further comprising a third compressed gas nozzle that ejects compressed gas toward the transparent lens from an inner side of the transparent lens.

9. The photographing device according to claim 8, further comprising a heating component used to heat the compressed gas in the third compressed gas nozzle to defrost.

10. The photographing device according to claim 1, further comprising a cleaning liquid nozzle that sprays a cleaning liquid to the transparent lens from an outer side of the transparent lens.

11. The photographing device according to claim 10, further comprising a wiper assembly that cooperates with the cleaning liquid nozzle to remove stains on a surface of the transparent lens.

12. The photographing device according to claim 1, wherein the cylindrical member and the cover plate are integrally formed.

13. The photographing device according to claim 1, wherein the lens holder is provided with a through hole that runs through the lens holder in a front-rear direction, and the transparent lens is mounted in the through hole and opposite to the camera in the front-rear direction.

14. A photographing device for a vehicle, comprising:
a seat;
a camera mounted on the seat;
a lens holder mounted on the seat and rotatable relative to the seat;
a transparent lens mounted on the lens holder and arranged opposite to the camera; and
a driving assembly connected with the lens holder to drive the lens holder to rotate relative to the base,
wherein the transparent lens is substantially cylindrical, the lens holder is provided with a first annular groove, a first end of the transparent lens is fitted in the first annular groove, and the base is arranged in the transparent lens.

15. The photographing device according to claim 14, further comprising a guide seat connected to the base and arranged opposite to the lens holder, wherein the guide seat is provided with a second annular groove, and a second end of the transparent lens is fitted in the second annular groove.

16. The photographing device according to claim 15, wherein the lens holder and the guide seat are both substantially cylindrical; the driving assembly comprises a motor, and an output shaft of the motor is connected to the lens holder.

17. The photographing device according to claim 15, wherein the base, the lens holder, and the guide seat are made of engineering plastics with self-lubrication, abrasion resistance, and good mechanical properties.

18. The photographing device according to claim 14, further comprising a compressed gas nozzle that ejects compressed gas toward the transparent lens from an inner side of the transparent lens.

19. A photographing device for a vehicle, comprising:
a seat;
a camera mounted on the seat;
a lens holder mounted on the seat and rotatable relative to the seat;
a transparent lens mounted on the lens holder and arranged opposite to the camera;
a driving assembly connected with the lens holder to drive the lens holder to rotate relative to the base; and
a compressed gas nozzle that ejects compressed gas toward the transparent lens from an outer side of the transparent lens.

* * * * *